Dec. 22, 1936. H. B. EASTWOOD Re. 20,209

GLASSWARE LEER CONSTRUCTION

Original Filed Dec. 2, 1933 2 Sheets-Sheet 1

Witness:
W. B. Thayer.

Inventor:
Harold B. Eastwood
by Brown & Parkar
Attorneys

Dec. 22, 1936. H. B. EASTWOOD Re. 20,209

GLASSWARE LEER CONSTRUCTION

Original Filed Dec. 2, 1933 2 Sheets-Sheet 2

Witness;
W. B. Shaw

Inventor:
Harold B. Eastwood
by Brown & Parham
Attorneys

Reissued Dec. 22, 1936 Re. 20,209

UNITED STATES PATENT OFFICE 20,209

GLASSWARE LEER CONSTRUCTION

Harold B. Eastwood, Hartford, Conn., assignor to Hartford-Empire Company, Hartford, Conn., a corporation of Delaware Original No. 1,997,250, April 9, 1935, Serial No. 700,648, December 2, 1933. Application for reissue June 12, 1936, Serial No. 84,913

24 Claims. (Cl. 49—47)

This invention relates to glassware annealing leers and particularly to the construction of such leers especially of portions adjacent to the hot end thereof.

The novel constructions forming the subject matter of my present invention are particularly applicable to the leer shown and described in the copending application of Wadman, Serial No. 441,793, filed April 5, 1930, now Patent No. 1,974,058, granted September 18, 1934, although, of course, they are also useful in other relations as will be obvious as the description proceeds.

Among the objects of my present invention are to provide means for supporting wall forming members of the inner tunnel in the more highly heated portions of a leer at least and in a manner such as to provide free floating movement permitting expansion and contraction under the influence of the heat in the leer. In this way buckling of the parts which might be caused due to relative expansion thereof is prevented.

A further object of my present invention is to provide for a leer of the character above set forth, or for other types of leers to which the construction is applicable, means permitting the independent removal for replacement, or repair, of wall-forming members of the tunnel without the necessity of completely tearing down such portions of the leer, and more particularly without the necessity of the shutting down of the leer as a whole except for a short period of time, thus economizing in heat and also in the time required for making repairs.

A further object of my invention is to provide practical means and arrangements for constructing leers of the type generally set forth in the Wadman patent above referred to, and other somewhat similar types, in a manner which will be relatively permanent, yet easily repairable.

Other objects and advantages of my present invention will become apparent from a reading of the following description and appended claims when taken in connection with the accompanying drawings, in which:

Fig. 3 is a fragmentary view in horizontal section taken substantially on the line 3—3 of Fig. 1.

Figure 1:
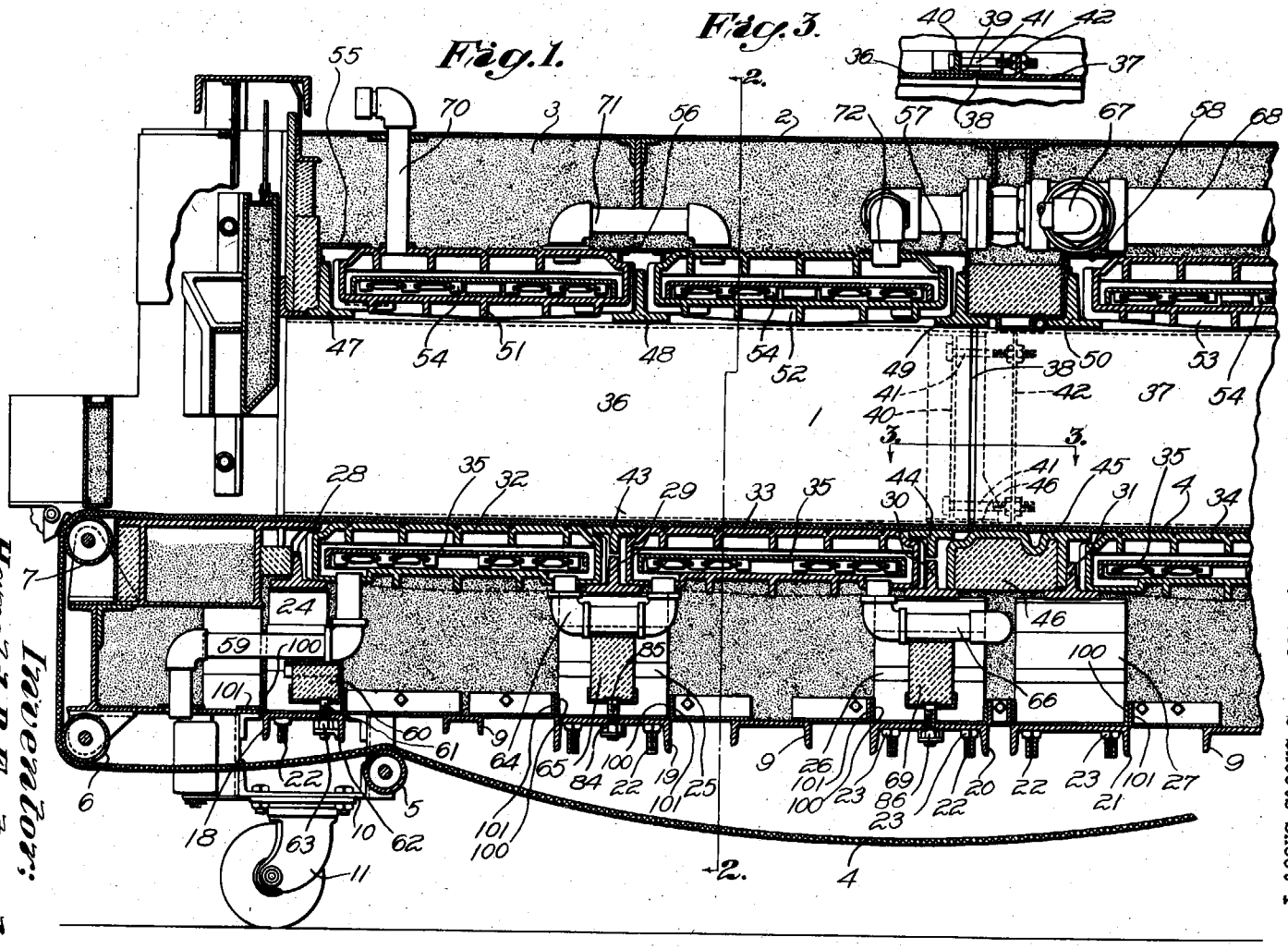
Figure 1 is a fragmentary view principally in vertical longitudinal section of the ware-entering end of a glassware annealing leer of the type disclosed in the Wadman patent above referred to but constructed according to my present invention.

Referring to the drawings wherein I have shown one embodiment of my invention, there is illustrated particularly in Figs. 1 and 2 a portion of the entrance end of a continuous glassware annealing leer comprising an inner tunnel generally indicated at 1 and an outer casing generally indicated at 2, the space therebetween with the exception of the space occupied by the supporting means for the inner tunnel hereinafter to be described being substantially filled with loose insulating material indicated at 3. Ware is moved through the leer upon a belt 4 of openwork reticulated wire mesh of the usual construction now generally employed in continuous glassware annealing leers, the driving means for the belt not being shown in the accompanying drawings, but being understood to be of conventional design. The ware-bearing strand of the belt 4 passes through the tunnel in sliding contact with the bottom thereof while the return strand passes from the belt driving means to the entrance end of the tunnel beneath the same, as indicated, the return strand being supported at intervals along the tunnel upon rollers as 5 and passing around rollers 6 and 7 adjacent to the entrance end of the tunnel.

The leer comprises an outer structural framework including longitudinally extending channel members 8 (Fig. 2) which are tied together at intervals along the leer by transversely extending structural members 9 (Fig. 1), these members being all rigidly secured together. The structural frame work is supported at intervals along the leer upon frame structures 10 which carry casters 11, so that the leer as a whole may be moved from place to place around the factory in which it is located, as may be desired.

The outer casing of the leer is preferably of relatively light sheet metal with only sufficient strength to hold in the loose insulating material 3, and is secured to and suitably supported by the structural framework previously described.

Extending between the longitudinal channel members 8 and transversely of the leer are a plurality of supporting channel members as 18, 19, 20 and 21. These members are mounted for vertical adjustment with respect to the channel members 8 by providing holes through the several members through which extend bolts 22 provided with nuts 23 on the underside of the members 18, 19, 20 and 21. Thus by loosening the nuts 23 on the bolts 22, the respective members 18, 19, 20 and 21 and similar members (not shown) along the other portions of the leer may be independently lowered from their operative positions as those shown in the drawings. Above each of the members 18, 19, 20 and 21 is a pan-like member of sheet material, the upturned flanges 100 of which cooperate with corresponding flanges 101 of portions of the outer casing 2 in preventing loss of the loose heat insulating material 3 when any of the members 18, 19, 20 or 21 are vertically adjusted as above described. The flanges 100 and 101 are so formed that they exert a resilient spring pressure against each other, thus keeping the joints substantially tight at all times.

Figure 2:
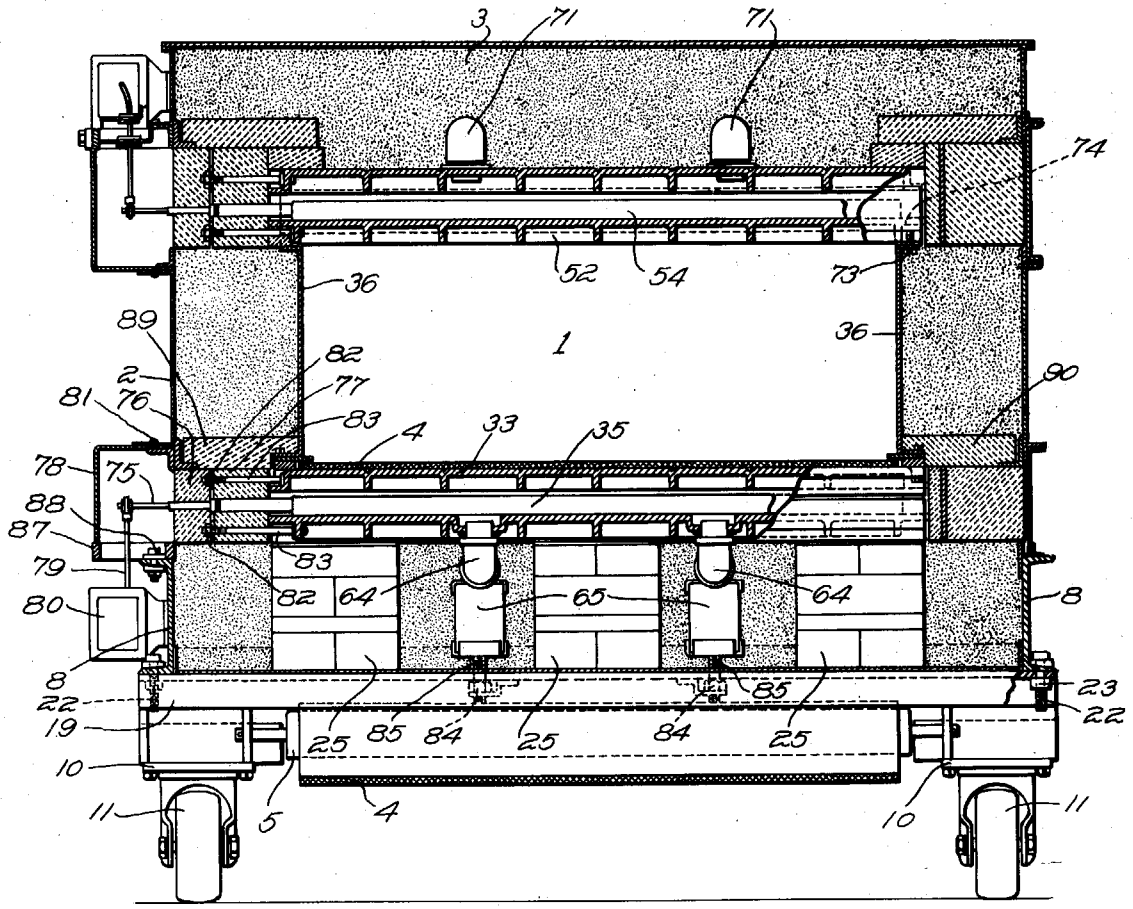
Fig. 2 is a transverse view in vertical section taken substantially on the line 2—2 of Fig. 1.

Each of these transversely extending vertically adjustable members 18 to 21 carries piers of suitable refractory material having a requisite strength for supporting the inner tunnel and particularly the floor sections thereof as will be hereinafter described, these piers being indicated at 24, 25, 26 and 27, there being preferably several piers transversely of the leer as indicated in Fig. 2. Supported on these piers and extending transversely of the leer are T-shaped members as indicated at 28, 29, 30 and 31, these members being unattached to the piers so as to be freely movable upon expansive or other movements of the tunnel forming members. The lower flanges of T-members 28 and 29 directly support the hollow floor-forming section 32. The lower flanges of the T-shaped members 29 and 30 directly support floor-forming section 33 and the lower flange of T-shaped member 31 and another similar member (not shown) directly support floor-forming member 34, these floor-forming members being free to move in all directions through a short distance and being floatingly supported, so as positively to prevent buckling or other undesired movement or bending upon the heating of the members or the leer during the operation of the latter. Within the floor-forming members 32, 33, 34, etc., are disposed electric heating elements 35 as shown, these elements being preferably of the type disclosed in my prior Patent No. 1,937,319, issued November 28, 1933. It is contemplated, however, that any suitable heating means may be used in connection with the floor forming members, or they may be unheated if desired.

The remainder of the inner tunnel comprises side wall members as indicated at 36 and 37 which are arranged in end to end relation, as illustrated in Figs. 1 and 3, and in connection with which there is provision for relative expansive movement between these members, there being an expansion joint 38 therebetween at the ends thereof. This expansion joint is shown in detail at Fig. 3 and is formed by an extension member 39 rigidly secured to the member 36 and having a portion overlying the joint between the members 36 and 37 so as to prevent ingress of any of the loose insulating material 3 into the tunnel. The member 39 is also provided with a flange portion 40 through which one or more bolts 41 extend, these bolts also passing through the flange 42 formed integral or rigid with the side member 37 and being provided with nuts as shown. The bolts 41 pass freely through the flange 40 so as to permit the members 36 and 37 to expand toward each other upon the heating of the leer. The side members 36 on each side of the leer are preferably rigidly secured to the front end structure, as illustrated in Fig. 1, this front end structure being rigid with the outer structural framework of the leer as shown. The side members 36, 37, etc., are tied together at intervals longitudinally of the leer by transversely extending T-shaped members as 43 and 44 secured to these side members as by bolts or otherwise. Sufficient space is provided between the flanges of T-shaped members 43 and 29, and 44 and 30 respectively so as to permit of the free floating movement of the bottom sections 32 and 33.

The members 37 are tied together at their lower edges adjacent to the joint 38 by a transversely extending member or casting 45 which may be filled with suitable insulating material 46 as illustrated. This member 45 is rigidly secured to the members 37 on each side of the leer. The lower end of the extension member 39 at the joint 38 has a portion 46 (Fig. 1) extending over the bottom flange portion of the member 37 and thus indirectly supports the side member 36 upon the member 45 so that should the member 33 be moved downwardly for removal, as will be hereinafter set forth, the side members 36 will remain adequately supported in position. The member 45 is loosely supported on the flanges of T-shaped members 30 and 31.

From the description thus far given, it will be seen that the sides and bottom members of the inner tunnel 1 are all rigidly supported from the outer rigid supporting structure while permitting free expansive movement of any of the floor forming members as 32, 33, 34, and permitting the lowering of these members sufficient to permit independent removal thereof without disturbing other parts of the leer.

The side members 36 and 37 are tied together at their upper edges by transversely extending T-shaped members 47, 48, 49, 50, etc., these members being rigidly secured to the side members as are the members 43—44. Supported upon the flanges of the members 47, 48, 49, 50 are a plurality of hollow roof forming members 51, 52, 53, etc., which may be similar in construction to the hollow floor forming members 32, 33, 34, etc. These roof forming members similarly are adapted to contain heating elements 54, preferably of the same type as the heating members 35, above referred to. The members 51, 52, 53, etc., are similarly arranged for floating support upon the flanges of the T-shaped members 47, 48, 49, 50, etc. Suitable sheet metal protectors illustrated at 55, 56, 57 and 58 may be provided to prevent the loose heat insulating material 3 from penetrating down between the members 51, 52, 53 and their supporting means.

Means are provided in the construction shown for passing a temperature controlling medium, in this case atmospheric air, through the floor and roof-forming members. As shown, such means comprise one or more pipe sections 59 communicating between the atmosphere beneath the leer and the interior of the floor forming member 32, this pipe having two elbows in it, as shown, and being supported upon a supporting member 60 principally of insulating material as indicated. Specifically this supporting member comprises a refractory block set in a metallic cup at its lower end and having at its upper end a metallic receptacle open in both directions longitudinally of the leer, the purpose of this construction being the same as that particularly shown and described in the patent to Russell and Wadman, No. 1,827,673, granted October 13, 1931. Inasmuch as this construction is fully set out in that patent, no further description thereof will be given except to point out that the construction permits of relative expansive movement of the parts in a direction longitudinally of the leer.

Means are provided for adjusting the support 60 vertically and for thus vertically adjusting the position of the pipe 59 to and from its operative position, which is that shown in the drawings. Such means comprises a bolt 61 rigid with the supporting member 60 and extending freely through the bottom casing which confines the insulating material 3 and through the member 18. Beneath the member 18 and spaced therefrom is a bracket member 62 and serving to confine between it and the center flange of the member 18 a nut 63 threaded on the bolt 61. Thus by rotating the nut 63 upon the bolt 61, the member 60 may be vertically adjusted to cause a vertical adjustive movement of the pipe 59 with respect to the supporting member 18 and hence with respect to the floor section 32 supported thereby, as seen in Fig. 1. The pipe 59 has a free sliding fit in a vertical direction with the floor section 32, so that when the member 60 is lowered, this pipe may be freely moved out of the floor section to permit lateral movement of the latter.

I also provide communicating between the interiors of the floor sections 32 and 33 one or more pipe members 64 supported upon one or more members 65 respectively similarly mounted to the member 60 for vertical adjustment with respect to the member 19. There is also shown one or more outlet pipes 66 extending from the member 33 for conducting the cooling air therefrom to one or more vertically extending pipes respectively which communicate as at 67 with an outlet duct 68, which is in turn connected to some suitable suction device, as the suction fan (not shown) commonly employed in connection with modern leers. The pipe member 66 is as shown supported upon a member 69 which is vertically adjustably supported from the member 20 in the same way as the member 60 is supported from the member 18. As shown in Fig. 2, there may be two, or even more, parallel pipes as 64 extending to and from any of the hollow floor sections 32—33, etc., for conducting temperature controlling media thereto and therefrom, these members being provided with independent supports as clearly illustrated.

Associated with the hollow roof forming sections 51, 52, 53, etc., I have provided a similar series of duct means for temperature controlling media, including one or more inlet pipes 70, one or more pipes 71 communicating between the interiors of the members 51 and 52, and one or more outlet pipes 72, these pipes all having a sliding fit in a vertical direction with their associated floor or roof-forming sections so as to permit their relative movement and thus permit of the lateral removal of the floor or roof forming sections.

In removing the roof-forming sections, it is usually simpler to take apart portions of the outer casing 2 of the roof and remove the loose insulating material 3 than to provide means as shown, and hereinafter to be described, for permitting lateral removal of these sections without dislocating other parts of the leer and without removing the loose insulating material.

Means are provided for preventing undue lateral displacement of the floating floor and roof-forming sections, such means comprising bolts passing through flanges of the side panels or sections as 36 and 37, the ends of which are loosely received in recesses formed in the floor and roof-forming sections as best illustrated at the upper right hand corner of the inner tunnel in Fig. 2 wherein the bolt 73 is shown passing through the horizontal flange of the side panel 36 and extending into a recess 74 formed in the lower right hand corner of the roof-forming section 52. It will be understood that all the floor and roof-forming sections are similarly prevented from undue lateral displacement while in their normal inoperative position. The means described and illustrated for this purpose are of such character as to permit any normal expansive movement of the floor and roof-forming sections under the influence of the heat to which the respective parts are subject during the operation of the leer.

In Fig. 2 there is illustrated the end of a floor-forming section at the left through which the current is conducted to the heating element 35 therein and the means by which this section may be removed without dislocating other parts of the leer. The heating element 35 is provided with suitable leads 75 passing through the insulating blocks 76 and 77 to a space within the hood member 78 and thence downwardly as at 79 to a junction box 80 wherein suitable electrical contacts may be made with the supply lines for the electric current.

If it is desired to remove the heating element assembly alone for replacement of such element, this may be done once the current is turned off, first by the swinging upward of the hood member 78 which is hingedly secured in position, as at 81, then by the disconnection of the vertical leads 79 from the horizontal leads 75, then by the removal of the block 76 exposing the nuts 82 on the ends of the bolts 83. These nuts are then removed and the block 77 removed along bolts 83. The heating element 35 may then be withdrawn for repair and/or a new one substituted therefor and the parts re-assembled.

If, however, it is necessary to remove the entire floor-forming section as 33, the disassembly is accomplished as previously set forth with the single exception that the heating element 35 need not be removed from the interior of the hollow floor-forming section 33 unless it is desired to do so. The first step in removing this section is to lower the supporting members 65 by rotating the nuts 84 upon the bolts 85, thus lowering the supporting members 65 and the connecting pipes 64, so that their upper ends are out of contact with and below the lower surface of the member 33. The pipes 66 are then similarly lowered by rotating the nuts 86, Fig. 1, to lower the supporting members 69 and thus lower the pipes 66 out of contact with the floor-forming section 33. This action is normally permitted due to the fact that the loose insulating material 3 is of such compressible nature that it normally affords no obstacle in the way of the movements described. The floor-forming section 33 may then be bodily lowered by lowering the transverse members 19 and 20 with respect to the outer rigid supporting structure by unscrewing the nuts 23 of those transverse members with respect to their bolts 22. This accomplishes a bodily lowering of both the member 33 and of the associated air conducting pipes 64 and 66 without relative movement between this section 33 and these pipes, here again the movement being permitted due to the compressible character of the insulating material 3. The lowering of the section 33 need only take place to such an extent that the lower ends of the transverse locating bolts similar to the bolts 73 are clear of the section 33 and also so as to take off any frictional resistance due to the weight of the belt 4 upon the upper surface of the section 33. If these bolts are not used, the section might be removed without lowering. In the usual case it will be necessary also to remove the lower member 87, Fig. 2, of the casing 78 which may be done by removing the bolt 88 as shown in that figure. The floor-forming section 33 may then be removed bodily by sliding it laterally to the left, as seen in Fig. 2, without dislocating any other parts of the leer and without requiring the removal of any of the loose heat insulating material 3. The insulating material 3 above the level of the floor of the tunnel is retained in place by the refractory blocks 89 and 90 which are supported as shown upon angle members carried by the outer casing and by the flanges at the lower edges of the side plates 36 of the inner tunnel. This entire operation may be accomplished in a very short time, sometimes not more than 15 minutes, so that it is not necessary to interrupt the operation of the leer for any material time if, and when, it becomes necessary to replace one of the floor-forming sections of the leer.

It may further be mentioned, that due to the fact that the transverse member 45 is rigidly secured to the side plates 37 and is supported upon the T-shaped member 31 carried by the piers 27, there will be no movement of this member even though the piers 26 be lowered so that no parts of the leer, other than those described, will be interfered with.

The assembly of the parts may be accomplished by a reverse series of operations exactly as has been explained for the removal of the floor-forming section 33, as will be obvious from a reading of the foregoing description and a consideration of the accompanying drawings.

From the construction shown, it will be seen that any of the floor-forming sections may be removed from the leer in substantially the same way as that particularly described for section 33, it being contemplated that all the floor-forming sections in the hotter portions of the leer will be similarly supported to permit their ready removal while at the same time these sections are floatingly supported while at their respective operative positions.

The arrangements and connections for the electric heating elements 54 of the upper or roof-forming sections are clearly illustrated in Fig. 2 and will be obvious from that figure when compared with the foregoing description of the arrangements and connections for the floor-forming sections and the heating elements 35 therein.

By the foregoing provisions, I have provided a leer construction which is eminently practical as has been proven in actual commercial operation and in which the various portions of the inner tunnel which are subject to the greatest heat are floatingly supported as opposed to the rigid construction of the prior art, thus tending to prevent undue buckling, warping or other undesired consequences during the operation of the leer.

I am aware that many changes may be made in the construction of glassware annealing leers without departing from the spirit of my invention and I, therefore, wish this invention to be measured solely by the appended claims which are to be construed as broadly as the state of the prior art permits.

I claim:

1. In a glass annealing leer, including an outer tunnel composed of insulating material and a structural framework, an inner tunnel including a wall-forming portion of hollow construction to form a passage for a gaseous temperature controlling medium, unattached either to other portions of said inner tunnel or to said framework and free to expand and move when heated, and means for supplying heat to the interior of said hollow wall-forming portion.

2. A tunnel type glassware annealing leer, comprising an outer structural framework, an inner tunnel supported from said framework and separated at least in part therefrom by insulating material, said inner tunnel including a wall-forming section of hollow metallic construction, unattached either to other portions of said inner tunnel or to said framework, and free to expand and move when heated, said section forming an enclosed passage for the passage of gaseous temperature controlling medium, an electric heating element within said hollow section, and guide brackets loosely receiving and supporting said hollow section to retain it substantially in a predetermined position to form a part of said inner tunnel while permitting expansive self-positioning movement thereof under the influence of the heat supplied by said electric heating element and the heat of the glassware in the leer.

3. A tunnel type glassware annealing leer, comprising an outer structural framework, an inner tunnel supported from said framework and separated at least in part therefrom by insulating material, said inner tunnel including a wall-forming section of hollow metallic construction, unattached either to other portions of said inner tunnel or to said framework and free to expand and move when heated, and means to conduct gaseous temperature controlling media to and from said hollow section, said conducting means having sliding joints with said hollow section, whereby to permit of relative movement between said conducting means and said section.

4. A tunnel type glassware annealing leer, comprising an outer structural framework, an inner tunnel supported from said framework and separated at least in part therefrom by insulating material, said inner tunnel including a wall-forming section of hollow construction, unattached either to other portions of said inner tunnel or to said framework and free to expand and move when heated, means for generating heat within said hollow wall-forming section, and means for floatingly supporting said section in substantially a predetermined position to form a part of said inner tunnel, the last named means including bracket guide members extending transversely of the leer and loosely receiving and supporting said hollow section, and stop means for preventing undue movement of said hollow section in a direction transverse of the leer along said guide members said guide members and said stop means being so constructed and arranged as to permit of any movement of said section which might occur upon it being heated during the operation of the leer.

5. A tunnel type glassware anneali g leer, comprising an outer structural framework, an inner tunnel supported from said framework and separated at least in part therefrom by insulating material, said inner tunnel including a plurality of floor sections, each of which is unattached to other portions of said inner tunnel, to each other, or to said framework, and is free independently to expand and move when heated, and supporting means for said floor sections including piers of high heat insulating material supported by said framework, and transversely extending T-shaped guide members resting on but unattached to said piers and loosely receiving said floor sections, whereby said sections are free to expand and move in any direction upon being heated during the operation of the leer.

6. A tunnel type glassware annealing leer, comprising an outer structural framework, an inner tunnel supported from said framework and separated at least in part therefrom by insulating material, said inner tunnel including a floor section which is removably associated with the other portions of said inner tunnel, means for supporting said floor section from said framework, and means removable to provide an opening through the insulation of said leer substantially of the size and shape of the cross sectional dimensions of said section, whereby said section may be laterally removed through said opening without substantially disturbing other portions of the leer whenever such removal is necessary for replacement or repair.

7. A tunnel type glassware annealing leer, comprising an outer structural framework, an inner tunnel supported from said framework and separated at least in part therefrom by insulating material, said inner tunnel including a floor section which is removably associated with the other portions of said inner tunnel, means vertically adjustable with respect to said framework for supporting said section therefrom and constructed and arranged to provide for a lowering movement of said section from its operative position, and means removable to provide an opening through the insulation of said leer and substantially of the size and shape of the cross sectional dimensions of said section, whereby said section may be lowered from its operative position sufficiently to permit its being moved laterally and thereafter may be removed laterally through said opening without substantially disturbing other portions of the leer whenever it is necessary to remove the section for replacement or repair.

8. A tunnel type glassware annealing leer, comprising an outer structural framework, an outer casing and an inner tunnel both supported from said framework, the space between said inner tunnel and said outer casing being substantially filled except for the supporting means for the inner tunnel with loose insulating material, said inner tunnel including a floor section which is removably associated with the other portions of said inner tunnel, means adjustable vertically with respect to said framework for supporting said section therefrom and constructed and arranged to provide for a lowering movement of said section from its operative position, and means removable to provide an opening extending from at least one side of said leer to one end of said section and substantially of the size and shape of the cross sectional dimensions of said section whereby said section may be lowered from its operative position sufficiently to permit its being moved laterally and thereafter may be removed laterally through said opening, the lowering means and the removable opening-providing means being so constructed and arranged that said section may be removed as aforesaid without disturbing and without the prior removal of any substantial amount of said loose insulating material.

9. A tunnel type glassware annealing leer, comprising an outer rigid structural framework, an inner tunnel and an outer casing both supported from said framework, the space between said inner tunnel and said outer casing being substantially filled, except for the supporting means for the inner tunnel, with loose heat insulating material, said inner tunnel including a floor section which is removably associated with the other portions of the inner tunnel, a transversely extending supporting member vertically adjustably supported from said framework, at least one pier of insulating material supported upon said transversely extending member and arranged in supporting relation with said floor section, whereby said floor section may be adjustably raised and lowered to and from its operative position as a part of the inner tunnel, means for preventing escape of the loose insulating material upon the adjustive lowering movement of said transversely extending member and said floor section, and means removable to provide an opening from at least one side of said leer to said section and substantially of the size and shape of the cross sectional dimensions of said floor section, whereby said section may be lowered from its operative position sufficiently to permit its being moved laterally and thereafter may be moved laterally through said opening, the lowering means and the removable opening-providing means being so constructed and arranged that said floor section may be removed as aforesaid without materially disturbing and without the prior removal of any substantial amount of said loose heat insulating material.

10. A tunnel type glassware annealing leer, comprising an outer structural framework, an inner tunnel supported from said framework and separated at least in part therefrom by insulating material, said inner tunnel including a floor section which is removably associated with the other portions of said inner tunnel, supporting means spaced longitudinally of the tunnel for supporting said floor section from said framework at at least two longitudinally spaced points, means mounting said supporting means for vertical adjustment with respect to said framework, whereby said floor section may be raised and lowered to and from its operative position, and means removable to provide an opening through the insulation at least at one side of said leer and substantially of the size and shape of the cross sectional dimensions of said floor section, whereby said section may be lowered from its operative position sufficiently to permit its being moved laterally and thereafter may be moved laterally through said opening without disturbing other portions of the leer whenever it is necessary to remove this section for replacement or repair.

11. A tunnel type glassware annealing leer, comprising an outer structural framework, an outer casing and inner tunnel both supported from said framework, said inner tunnel being separated at least in part from said structural framework and said outer casing by insulating material, said inner tunnel including a plurality of floor sections each independently removably supported from said framework without disturbing the remainder of the inner tunnel, said inner tunnel further including a plurality of side wall sections arranged in end to end relation to each other and having expansion joints therebetween, means for supporting said side wall sections and the inner tunnel from said outer structural framework including transversely extending members adjacent to each joint between contiguous side wall sections, said transversely extending members being rigidly secured to one of said contiguous side wall sections at either end thereof, the others of said contiguous side wall sections having longitudinally extending portions extending over and adapted to be supported by said transversely extending members respectively, and at least two means for independently supporting each of said transversely extending members from said outer structural framework, whereby the side wall sections and the inner tunnel portions other than the floor sections thereof may be supported from said structural framework independently of any one of said floor sections and thus permit the removal of any one of the latter without disturbing the remainder of the inner tunnel.

12. A tunnel type glassware annealing leer, comprising an outer structural framework, an inner tunnel supported from said framework and separated at least in part therefrom by insulating material, said inner tunnel including a plurality of independently movable floor sections, means including piers vertically adjustable with respect to and supported by said outer structural framework for supporting adjacent ends of said floor sections in a direction longitudinally of the leer, means individual to each of said floor sections and removably located in at least one lateral side of the leer to provide an opening through the insulation at such side of the leer for permitting the removal each of said floor sections respectively, said openings being substantially of the size and shape of the cross sectional dimensions of their repective floor sections, whereby each floor section may be lowered from its operative position sufficiently to permit its being moved laterally and thereafter may be moved laterally through its respective opening without disturbing other portions of the leer whenever it is necessary to remove the section for replacement or repair, said inner tunnel further including a plurality of side members arranged in end to end relation, transversely extending members supported from said outer structural framework in a manner similar to the support for said floor sections and arranged to form a portion of the floor of the leer substantially complementary to said floor sections, said transversely extending members being each rigidly secured at its ends to one of said wall sections of the inner tunnel adjacent to a joint between that and a contiguous wall section, overlapping flange members on one of each pair of contiguous wall sections and arranged to be supported from the transversely extending member which is respectively rigid with the others of each of said pairs of contiguous wall sections, whereby the side walls of the inner tunnel will be supported from said outer structural framework independent of any one of the removable floor sections of the inner tunnel thus permitting the removal of any one of the latter for purposes of replacement or repair.

13. A tunnel type glassware annealing leer, comprising an outer structural framework, an inner tunnel supported from said framework and separated at least in part therefrom by insulating material, said inner tunnel including a hollow floor section which is removably associated with other portions of said inner tunnel, means vertically adjustable with respect to said framework for supporting said section therefrom and constructed and arranged to provide an adjustive lowering movement of said framework from its operative position, means to conduct gaseous temperature-controlling media to and from said hollow floor section, said conducting means having sliding joints with said hollow section to permit of relative movement therebetween, means mounted on the vertically adjustable supporting means for said floor section for independently vertically adjustably supporting said conducting means therefrom, and means removable to provide an opening through the insulation at least at one side of said leer and substantially of the size and shape of the cross sectional dimensions of said floor section, whereby in removing said floor section said conducting means may be first lowered out of engagement therewith, said floor section and said conducting means may then be lowered together sufficiently to permit the floor section being moved laterally through said opening and said floor section may thereafter be removed laterally through said opening without disturbing other portions of the leer whenever it is necessary to remove said section for replacement or repair.

14. A tunnel type glassware annealing leer, comprising an outer structural framework, an inner tunnel supported from said framework and separated at least in part therefrom by insulating material, said inner tunnel including a floor section which is unattached either to the other portions of said inner tunnel or to said framework and which is free to expand and move under the influence of heat upon the operation of the leer, said floor section being further removably associated with other portions of said inner tunnel, means vertically adjustable with respect to said framework for supporting said floor section therefrom and constructed and arranged to provide for an adjustive lowering movement of said section from its operative position, and means removable to provide an opening through the insulation at least at one side of said leer and substantially of the size and shape of the cross sectional dimensions of said section, whereby said section is floatingly supported while at its operative position and may be lowered therefrom sufficiently to permit its being moved laterally through said opening without disturbing other portions of the leer whenever it is necessary to remove said section for replacement or repair.

15. A tunnel type glassware annealing leer, comprising an outer structural framework, an outer casing and inner tunnel both supported from said framework, said inner tunnel including a floor section of hollow construction, unattached either to said other portions of said inner tunnel or to said framework and free to expand and move when heated, means for supplying heat to the inside of said inner tunnel from the interior of said hollow floor section by conduction through the common wall of said section and said inner tunnel, the space between said inner tunnel and said outer casing being substantially filled, except for the supporting means for the inner tunnel, by loose heat insulating material, means vertically adjustable with respect to said framework for floatingly supporting said floor section therefrom and constructed and arranged to provide for an adjustive lowering movement of said floor section from its operative position, and means removable to provide an opening extending from at least one side of said leer to one end of said section and substantially of the size and shape of the cross sectional dimensions of said section, whereby said sections may be lowered from its operative position sufficiently to permit its being moved laterally and thereafter may be removed laterally through said opening, the lowering means and removable opening-providing means being so constructed and arranged that said section may be removed as aforesaid without materially disturbing and without the prior removal of any substantial amount of said loose heat-insulating material.

16. A tunnel type glassware annealing leer, comprising an outer structural framework, an inner tunnel supported from said framework and separated at least in part therefrom by insulating material, said inner tunnel including a floor-forming section of hollow construction, unattached either to other portions of said tunnel or to said framework and floatingly supported to permit it to expand and move when heated, means to conduct temperature controlling media to and from said hollow-floor-forming section, said conducting means having sliding joints with said hollow section to permit a relative movement between said conducting means and said section, means adjustable vertically with respect to said framework and supported thereby for supporting said section therefrom and constructed and arranged to provide for the lowering movement of said section from its operative position, other means for supporting said conducting means from said section-supporting means and arranged to provide for vertical adjustment between said conducting means and said floor-forming section sufficient to permit of relative lateral movement therebetween, and means to provide an opening through the insulation at least at one side of said leer and substantially of the size and shape of the cross-sectional dimensions of said section, whereby said section may be removed from its operative position in said inner tunnel first by relatively moving said conducting means downward out of contact therewith, second by adjustably lowering said section and said conducting means as a unit with respect to the remainder of the leer, and third by laterally removing said section through said opening.

17. A tunnel type glassware annealing leer, comprising an outer structural framework, an inner tunnel supported from said framework and separated at least in part therefrom by insulating material, said inner tunnel including a floor section of hollow metallic construction unattached either to other portions of said inner tunnel or to said framework and free to expand and move when heated, an electric heated element removably positioned within said hollow floor section, means to conduct cooling air to and from said floor section, said conducting means having vertically sliding joints with said floor section to permit of relative movement therebetween, means supported by and vertically adjustable with respect to said framework for supporting said floor section therefrom and constructed and arranged to provide for a lowering movement from said floor section from its operative position, other means for independently vertically supporting said conducting means from and for movement with respect to the floor section supporting means to provide for a relative movement therebetween, and means removable to provide an opening through the insulation at least from one side of the leer to said floor section and substantially of the size and shape of the cross sectional dimensions of said floor section, whereby said electric heating element may be laterally removed from said floor section through said opening, and whereby said section may be bodily removed from the leer for adjustment and repair by first relatively moving said conducting means with respect to said floor section to permit of relative lateral movement therebetween, second by lowering said floor section and said conducting means as a unit to permit of the lateral movement of the former with respect to other portions of the leer, and third by laterally removing said floor section bodily through said opening.

18. A tunnel type glassware annealing leer, comprising an outer structural framework, an outer casing and an inner tunnel both supported from said framework, the space between said inner tunnel and said outer casing being substantially filled, except for the supporting means of the inner tunnel, with loose heat-insulating material, said inner tunnel including a plurality of independently removable floor sections of hollow construction, an electric heating element within each of said floor sections, conducting means associated with each of said floor sections for passing cooling air therethrough when desired, said conducting means having vertically sliding joints with said hollow floor sections, transversely extending members supported by and independently vertically adjustable with respect to said outer structural framework, piers supported by said transversely extending members each supporting at least one side of a floor section in a direction longitudinally of the leer, transversely disposed T-shaped members supported on said piers for directly supporting said floor sections, the floor sections being floatingly supported on said T-shaped members to permit of expansion and movement thereof under the influence of heat upon the operation of a leer, means to prevent undue lateral displacement of said floor sections when in their respective operative positions, said inner tunnel also including a plurality of side members arranged in end-to-end relation, and having expansion joints therebetween, transverse supporting members for said side members arranged to be supported by said T-shaped members and each rigidly connected at one end to one of a pair of said side members adjacent to the expansion joints between the pair of side members, an extended flange-like member rigidly secured to the other side member of each pair at each joint arranged to prevent the loose heat-insulating material from penetrating to the interior of the inner tunnel irrespective of expansion and contraction of the side members of the leer, said extension members being supported upon the transversely extending members which support and are secured to the contiguous side members of each pair, independent means for supporting said conducting means for vertical adjustment with respect to said floor sections and the supporting means therefor, and means removable to provide an opening through the insulation at one side of the leer adjacent to each of said floor sections and substantially of the size and shape of the cross sectional dimensions of said floor sections respectively, whereby said heating elements may be laterally removed from their respective floor sections through said openings, and whereby when it is desired to remove one of the floor sections bodily, this may be done through its respective opening without disturbing any material amount of the loose insulating material or requiring the removal thereof by first lowering said conducting means with respect to the floor sections out of contact therewith, second, lowering the floor section to be removed with respect to other portions of the leer to permit of its lateral movement without any relative movement between the floor section and the conducting means therefor, and third, laterally removing the floor section bodily through its respective opening.

19. In an annealing furnace of the continuous type, a heating chamber formed of a plurality of individual bottom, side and top sections, each of said top sections being freely movable with respect to and unattached to any other section, whereby any one of the top sections may expand or contract independently of the other sections.

20. A leer of the continuous type having a central tunnel formed of a plurality of individual bottom, side and top sections, each bottom section forming a part of a passage for gaseous temperature controlling media and being unconnected and free to move independently of each other in the plane of the bottom of the tunnel.

21. In a leer of the continuous type including a source of heat, an inner tunnel formed of a plurality of bottom, side and top sections, means to support the top sections comprising a plurality of transverse members mounted in spaced relation lengthwise of the leer, said members being constructed and arranged to receive and support the ends of said sections, the top sections being hollow and inter-connected by means of hollow coupling members to form a conduit extending longitudinally of the leer.

22. In a glassware annealing leer including an outer tunnel composed of insulating material and a structural framework, an inner tunnel having its top formed of hollow portions unattached either to other portions of said inner tunnel or to said framework and free to expand and move when heated, and means for supplying heat to the interior of said hollow portions.

23. A glassware annealing leer, comprising a tunnel, means for passing glassware therethrough, said tunnel being formed in part by top and bottom hollow sections, each so constructed, arranged and mounted as to be movable independently of other portions of the leer, and means for causing temperature controlling media to pass through said top and bottom hollow sections to control the temperature within said tunnel.

24. A glassware annealing leer, comprising a plurality of top and bottom hollow sections in part defining a tunnel, means for passing glassware through the tunnel, each of said hollow sections being unattached to other portions of the leer and free to expand and move when heated, and means for supplying heat to the interior of said top and bottom sections and thereby to the ware passing through the tunnel.

HAROLD B. EASTWOOD.